United States Patent
Zheng

(10) Patent No.: US 12,121,812 B2
(45) Date of Patent: Oct. 22, 2024

(54) AUDIO FREQUENCY SIGNAL PROCESSING METHOD AND APPARATUS, TERMINAL AND STORAGE MEDIUM

(71) Applicant: BEIJING BYTEDANCE NETWORK TECHNOLOGY CO., LTD., Beijing (CN)

(72) Inventor: Wei Zheng, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 420 days.

(21) Appl. No.: 17/612,981

(22) PCT Filed: Mar. 11, 2020

(86) PCT No.: PCT/CN2020/078871
§ 371 (c)(1),
(2) Date: Nov. 19, 2021

(87) PCT Pub. No.: WO2020/238325
PCT Pub. Date: Dec. 3, 2020

(65) Prior Publication Data
US 2022/0212108 A1    Jul. 7, 2022

(30) Foreign Application Priority Data
May 24, 2019   (CN) .......................... 201910441582.X

(51) Int. Cl.
*A63F 13/54* (2014.01)
*A63F 13/215* (2014.01)
(Continued)

(52) U.S. Cl.
CPC ............ *A63F 13/54* (2014.09); *A63F 13/215* (2014.09); *G06F 3/165* (2013.01); *H04R 5/04* (2013.01);
(Continued)

(58) Field of Classification Search
CPC ......... A63F 13/54; A63F 13/215; G06F 3/165
See application file for complete search history.

(56) References Cited

U.S. PATENT DOCUMENTS 6,529,875 B1 * 3/2003 Nakajima ............... G10L 15/26
704/E15.045
10,143,921 B1   12/2018 Strahle
(Continued)

FOREIGN PATENT DOCUMENTS

CN    103127718 A    6/2013
CN    103595363 A    2/2014
(Continued)

OTHER PUBLICATIONS

International Patent Application No. PCT/CN2020/078871; Int'l Search Report; dated May 27, 2020; 2 pages.

*Primary Examiner* — James S. McClellan
(74) *Attorney, Agent, or Firm* — BakerHostetler

(57) ABSTRACT

An audio signal processing method, an audio signal processing apparatus, a terminal, and a storage medium are provided. In the method, audio signal in a first period of time is collected. A reference sound volume is determined based on the collected audio signal. Audio signal sampling is performed on the audio signal at multiple audio sampling points in a second period of time to obtain multiple audio sampling signals. In a case of determining that the multiple audio sampling signals meet a predetermined condition based on the reference sound volume, a basis sound volume is determined based on the multiple audio sampling signals. The basis sound volume is used for controlling a display effect of a target object in a virtual scene, and different basis sound volumes correspond to different display effects of the target object.

17 Claims, 10 Drawing Sheets

(51) Int. Cl.
*G06F 3/16* (2006.01)
*H04R 5/04* (2006.01)

(52) U.S. Cl.
CPC .. *A63F 2300/6081* (2013.01); *H04R 2430/01* (2013.01)

(56) References Cited

U.S. PATENT DOCUMENTS

2012/0015731 A1* 1/2012 Fargo ...................... A63F 13/10
463/36
2015/0280671 A1 10/2015 Hsu et al.

FOREIGN PATENT DOCUMENTS

| | | |
|---|---|---|
| CN | 104225916 A | 12/2014 |
| CN | 106028145 A | 10/2016 |
| CN | 108404410 A | 8/2018 |
| CN | 108766460 A | 11/2018 |
| CN | 109157836 A | 1/2019 |
| CN | 110099333 A | 8/2019 |
| JP | 2018-163420 A | 10/2018 |

* cited by examiner

AUDIO FREQUENCY SIGNAL PROCESSING METHOD AND APPARATUS, TERMINAL AND STORAGE MEDIUM

REFERENCE TO RELATED APPLICATION

The present application is National Phase Application of PCT international patent application of PCT/CN2020/078871, filed on Mar. 11, 2020, which claims priority to Chinese Patent Application No. 201910441582.X, titled "AUDIO SIGNAL PROCESSING METHOD AND APPARATUS, TERMINAL AND STORAGE MEDIUM", filed on May 24, 2019, both of which are incorporated herein by reference in their entireties.

FIELD

The present disclosure relates to the field of computer technology, and in particular to an audio signal processing method, an audio signal processing apparatus, a terminal, and a storage medium.

BACKGROUND

In scenarios of implementing an audio special effect, i.e., triggering a special effect by a sound, and in sound volume control games, a special effect is triggered or a game character is controlled based on a detected sound volume. In a process of implementing an audio special effect or playing a game by a user, the same sound made by the user may be detected to have different volumes, due to different distances between the user and a mobile phone, different volume settings of the microphone of the mobile phone, and the like.

SUMMARY

In view of the above, an audio signal processing method, an audio signal processing apparatus, a terminal, and a storage medium are provided according to the embodiments of the present disclosure.

An audio signal processing method is provided according to the embodiments of the present disclosure. The method includes: collecting an audio signal in a first period of time; determining a reference sound volume based on the collected audio signal; performing audio signal sampling on the audio signal at multiple audio sampling points in a second period of time to obtain multiple audio sampling signals; and determining, in a case of determining that the multiple audio sampling signals meet a predetermined condition based on the reference sound volume, a basis sound volume based on the multiple audio sampling signals. The basis sound volume is used for controlling a display effect of a target object in a virtual scene and different basis sound volumes correspond to different display effects of the target object.

In the above solutions, the determining a reference sound volume based on the collected audio signal includes: processing the collected audio signal to obtain sound volumes corresponding to the audio signal in the first period of time; and acquiring an average of the sound volumes corresponding to the audio signal in the first period of time and determining the acquired average as the reference sound volume.

In the above solutions, the determining a reference sound volume based on the collected audio signal includes: processing the collected audio signal to obtain a maximum sound volume and a minimum sound volume of the audio signal in the first period of time; and determining an average of the maximum sound volume and the minimum sound volume as the reference sound volume.

In the above solutions, the method further includes: acquiring a sampling interval for the audio signal sampling; and determining the multiple audio sampling points in the second period of time based on the sampling interval.

In the above solutions, the determining, in a case of determining that the multiple audio sampling signals meet a predetermined condition based on the reference sound volume, a basis sound volume based on the multiple audio sampling signals includes: determining, in a case of determining that sound volumes of the multiple audio sampling signals are all greater than the reference sound volume and a maximum sound volume of the multiple audio sampling signals is greater than a predetermined sound volume threshold, the basis sound volume based on the multiple audio sampling signals.

In the above solutions, the determining, in a case of determining that the multiple audio sampling signals meet a predetermined condition based on the reference sound volume, a basis sound volume based on the multiple audio sampling signals includes: determining a valid audio sampling signal in the multiple audio sampling signals based on the reference sound volume; and calculating, in a case of determining that a quantity of valid audio sampling signals is greater than a predetermined quantity threshold and a maximum sound volume of multiple valid audio sampling signals is greater than a predetermined sound volume threshold, an average of sound volumes of the multiple valid audio sampling signals to obtain the basis sound volume.

In the above solutions, the determining a valid audio sampling signal in the multiple audio sampling signals based on the reference sound volume includes: processing the multiple audio sampling signals to obtain sound volumes of the multiple audio sampling signals; and determining an audio sampling signal having a sound volume greater than the reference sound volume as a valid audio sampling signal.

In the above solutions, the determining a basis sound volume based on the multiple audio sampling signals includes: processing the obtained multiple audio sampling signals to acquire sound volumes of the multiple audio sampling signals; and acquiring an average of the sound volumes of the multiple audio sampling signals and determining the average of the sound volumes of the multiple audio sampling signals as the basis sound volume.

An audio signal processing apparatus is further provided according to the present disclosure. The apparatus includes a collecting unit, a determining unit, a sampling unit, and a processing unit. The collecting unit is configured to collect an audio signal in a first period of time. The determining unit is configured to determine a reference sound volume based on the collected audio signal. The sampling unit is configured to perform audio signal sampling on the audio signal at multiple audio sampling points in a second period of time to obtain multiple audio sampling signals. The processing unit is configured to determine, in a case of determining that the multiple audio sampling signals meet a predetermined condition based on the reference sound volume, a basis sound volume based on the multiple audio sampling signals. The basis sound volume is used for controlling a display effect of a target object in a virtual scene and different basis sound volumes correspond to different display effects of the target object.

In the above solutions, the determining unit is further configured to: process the collected audio signal to obtain sound volumes corresponding to the audio signal in the first period of time; and acquire an average of the sound volumes corresponding to the audio signal in the first period of time, and determine the acquired average as the reference sound volume.

In the above solutions, the determining unit is further configured to: process the collected audio signal to obtain a maximum sound volume and a minimum sound volume of the audio signal in the first period of time; and determine an average of the maximum sound volume and the minimum sound volume as the reference sound volume.

In the above solutions, the apparatus further includes an acquiring unit. The acquiring unit is configured to acquire a sampling interval for the audio signal sampling, and determine the multiple audio sampling points in the second period of time based on the sampling interval.

In the above solutions, the processing unit is further configured to: determine, in a case of determining that sound volumes of the multiple audio sampling signals are all greater than the reference sound volume and a maximum sound volume of the multiple audio sampling signals is greater than a predetermined sound volume threshold, the basis sound volume based on the multiple audio sampling signals.

In the above solutions, the processing unit is further configured to: determine a valid audio sampling signal in the multiple audio sampling signals based on the reference sound volume; and calculate, in a case of determining that a quantity of valid audio sampling signals is greater than a predetermined quantity threshold and a maximum sound volume of multiple valid audio sampling signals is greater than a predetermined sound volume threshold, an average of sound volumes of the multiple valid audio sampling signals to obtain the basis sound volume.

In the above solutions, the processing unit is further configured to: process the multiple audio sampling signals to obtain sound volumes of the multiple audio sampling signals; and determine an audio sampling signal having a sound volume greater than the reference sound volume as the valid audio sampling signal.

In the above solutions, the processing unit is further configured to: process the obtained multiple audio sampling signals to acquire sound volumes of the multiple audio sampling signals; and acquire an average of the sound volumes of the multiple audio sampling signals and determine the average of the sound volumes of the multiple audio sampling signals as the basis sound volume.

A terminal is further provided according to the embodiments of the present disclosure. The terminal includes a memory and a processor. The memory is configured to store executable instructions. The processor is configured to execute the executable instructions stored in the memory to perform the audio signal processing method according to the embodiments of the present disclosure.

A non-transient storage medium is further provided according to the embodiments of the present disclosure. The non-transient storage medium stores executable instructions that are used for performing, when being executed, the audio signal processing method according to the embodiments of the present disclosure.

Beneficial effects of the embodiments of the present disclosure are described as following.

In the embodiments of the present disclosure, the reference sound volume is determined based on the audio signal collected in the first period of time, and in a case of determining that the multiple audio sampling signals in the second period of time meet the predetermined condition based on the reference sound volume, the basis sound volume is determined based on the multiple audio sampling signals. Since the basis sound volume is determined based on the multiple audio sampling signals in the second period of time, which are irrelevant to a distance between the user and the terminal or the sound volume setting of a microphone of the terminal, the basis sound volume can be determined based on the multiple audio sampling signals in the second period of time as long as the multiple audio sampling signals in the second period of time meet the predetermined condition. In this way, inaccurate audio collection caused by a change in the distance between the user and the terminal or by different sound volume settings of the microphone of the terminal is avoided, thereby improving accuracy of the basis sound volume used for controlling a display effect of a target object in a virtual scene.

DETAILED DESCRIPTION OF EMBODIMENTS

Figure 1:
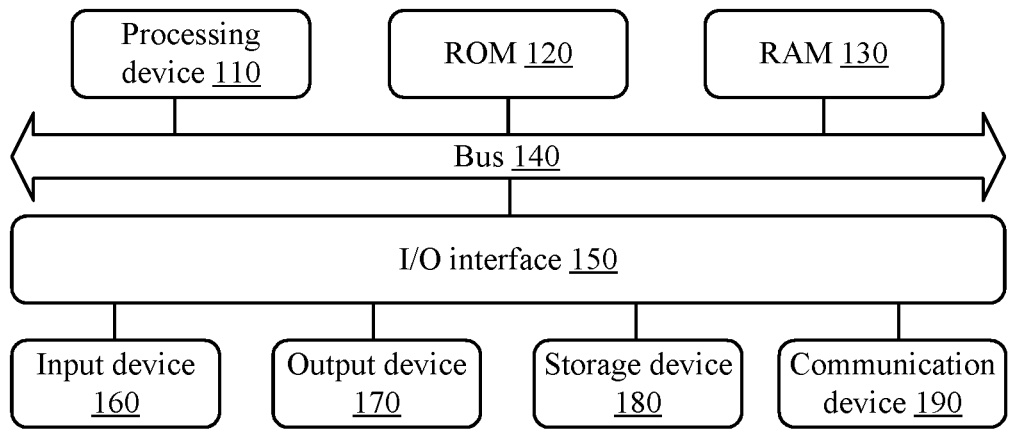
FIG. 1 is a schematic structural diagram of an audio signal processing apparatus according to an embodiment of the present disclosure.

In the following descriptions, "some embodiments" are described, which form a subset of all possible embodiments. However, it can be understood that "some embodiments" may be the same or different subsets of all possible embodiments and may be combined with each other in a case of no conflict.

Unless otherwise defined, all technical terms and scientific terms used herein have meanings generally understood by those skilled in the art. The terms used herein are only used for describing the embodiments and are not intended to limit the embodiments of the present disclosure.

The flowcharts and block diagrams in the drawings of the embodiments of the present disclosure show architectures, functions and operations that may be realized in the systems, methods and computer program products according to the embodiments of the present disclosure. Each block in the flowcharts or block diagrams may represent a module, a program segment or a part of codes. The module, the program segment or the part of codes includes one or more executable instructions for implementing a specified logical function. It should be noted that in some alternative implementations, functions indicated in the blocks may also be performed in an order different from that indicated in the drawings. For example, two steps respectively indicated in two blocks that are connected to each other in an order may be implemented in parallel. Sometimes the two steps may be implemented in a reverse order, which depends on a function related to the steps. It should also be noted that each block in the block diagrams and/or flowcharts and a combination of blocks in the block diagrams and/or flowcharts may be implemented by a dedicated hardware-based system for performing a specified function or operation or implemented by a combination of a special hardware and a computer instruction.

Nouns and terms referred to in the embodiments of the present disclosure are explained before describing the embodiments of the present disclosure in detail. The nouns and the terms referred to in the embodiments of the present disclosure are explained as followings.

1) An audio signal refers to an information carrier of speech, music and sound effect having regular changes of frequency and amplitude of sound waves.
2) A virtual scene refers to a scene that is outputted by a device and is different from the real world. Visual perception for the virtual scene can be achieved through naked eyes or by means of a device. For example, the virtual scene may be a two dimensional image outputted by a display screen, or a three dimensional image outputted based on a stereoscopic display technology such as a stereoscopic projection technology, a virtual reality technology and an augmented reality technology. In addition, various perceptions, such as auditory perception, tactile perception, olfactory perception and motion perception, can be achieved through a variety of hardware, to simulate the real world. For example, the virtual scene may be a virtual scene of a game, a special effect scene, and the like.
3) An object refers to a character of various persons and objects that may interact with the user in a virtual scene, such as a character controlled by an audio in a virtual scene of a game and a character controlled by an audio in a special effect scene.

Based on the above interpretation of the nouns and the terms referred to in the embodiments of the present disclosure, the audio signal processing apparatus according to the embodiments of the present disclosure is described hereafter. The audio signal processing apparatus according to the embodiments of the present disclosure may be implemented in various forms. For example, the audio signal processing apparatus may be independently implemented by a terminal such as a smart phone, a tablet computer and a desktop. Alternatively, the audio signal processing apparatus may be implemented by a terminal and a server in cooperation. The audio signal processing apparatus according to the embodiments of the present disclosure may be implemented as hardware, software or a combination of software and hardware. Various exemplary embodiments of the audio signal processing apparatus according to the embodiments of the present disclosure are described hereafter.

A hardware structure of the audio signal processing apparatus according to the embodiments of the present disclosure is described in detail hereafter. FIG. 1 is a schematic structural diagram of the audio signal processing apparatus according to the embodiments of the present disclosure. The apparatus shown in FIG. 1 is only an example and do not limit functions and application scopes of the embodiments of the present disclosure.

As shown in FIG. 1, the audio signal processing apparatus may include a processing device (for example, a central processing unit, a graphics processing unit and the like) 110. The processing device 110 may perform various proper actions and processing based on a grogram stored in a read-only memory (ROM) 120 or a program loaded from a storage device 180 to a random-access memory (RAM) 130. The RAM 130 further stores various programs and data for an operation of a terminal. The processing device 110, the ROM 120 and the RAM 130 are connected to each other through a bus 140 (or other communication connection line). An input/output (I/O) interface 150 is also connected to the bus 140.

Generally, the following may be connected to the I/O interface 150: an input device 160 such as a touch screen, a touch pad, a keyboard, a mouse, a camera, a microphone, an accelerometer, a gyroscope, an output device 170 such as a liquid crystal display (LCD), a speaker, a vibrator, a storage device 180 such as a magnetic tape, a hard disk, and a communication device 190. By the communication device 190, the terminal may communicate with other devices in a wired or wireless manner to exchange data. Although FIG. 1 shows various devices, it should be understood that not all shown devices are required to be implemented or included. The shown devices may be replaced by other devices, or more or less devices may be included.

According to the embodiments of the present disclosure, the process described in the above flowchart may be implemented as a computer software program. For example, the embodiments of the present disclosure include a computer program product. The computer program product includes a computer program stored in a computer readable medium. The computer program includes program codes for performing the method shown in the flowchart. In such embodiments, the computer program may be downloaded and installed from the network through the communication device 190, installed from the storage device 180, or installed from the ROM 120. The computer program, when being executed by the processing device 110, performs functions defined in the method according to the embodiments of the present disclosure.

It should be noted that the computer readable medium according to the embodiments of the present disclosure may be a computer readable signal medium, a computer readable storage medium or any combination of the computer readable signal medium and the computer readable storage medium. For example, the computer readable storage medium may include, but is not limited to, an electronic, magnetic, optical, electromagnetic, infrared, or semiconductor system, apparatus, or device, or any combination of the above. In addition, the computer readable storage medium may also include but is not limited to: electrical connections having at least one wire, a portable computer disk, a hard disk, a random access memory (RAM), a read only memory (ROM), erasable programmable read-only memory (EPROM or a flash memory), an optical fiber, a portable compact disc read-only memory (CD-ROM), a light storage device, a magnetic storage device, or any suitable combination of the above.

In the embodiments of the present disclosure, the computer readable storage medium may be any physical medium including or storing a program. The program may be used by an instruction execution system, an instruction execution apparatus or an instruction execution device or may be used in combination with the instruction execution system, the instruction execution apparatus and the instruction execution device. In the embodiments of the present disclosure, the computer readable signal medium may include a data signal transmitted in a baseband or transmitted as a part of a carrier wave. The data signal carries computer readable program codes. The transmitted data signal may be in a variety of forms including, but not limited to, an electromagnetic signal, an optical signal, or any suitable combination of the above. The computer readable signal medium may also be any other computer readable medium except for the computer readable storage medium. The computer readable medium can send, transmit or transfer programs used by or used in combination with an instruction execution system, an instruction execution apparatus or an instruction execution device. The program codes included in the computer readable medium may be transferred through any proper medium including, but not limited to, an electric wire, an optical cable, radio frequency (RF) and any proper combination of the above.

The computer readable medium may be included in the terminal. Alternatively, the computer readable medium may exist independently and not assembled in the terminal.

The computer readable medium may carry one or more programs. The one or more programs, when being executed by a terminal, cause the terminal to perform the audio signal processing method according to the embodiments of the present disclosure.

The computer program codes for performing the operations according to the present disclosure may be written in one or more programming languages or a combination of the one or more programming languages. The programming language includes an object oriented programming language such as Java, Smalltalk, C++ and a conventional procedural programming language such as "C" programming language or a similar language. The program codes may be completely executed on a user computer, partially executed on the user computer, executed as a standalone software package, partially executed on the user computer and partially executed on a remote computer, completely executed on the remote computer or a server. In the cases relating to the remote computer, the remote computer may be connected to the user computer via any kind of networks including Local Area Network (LAN) and Wide Area Network (WAN), or the remote computer may be connected to an external computer (for example, via Internet provided by an Internet service provider).

Units and/or modules described in the embodiments of the present disclosure may be implemented through software or hardware.

In a case that the units and/or modules described in the embodiments of the present disclosure are implemented through hardware, the units and/or modules may be implemented by one or more Application Specific Integrated Circuits (ASICs), DSPs, Programmable Logic Devices (PLDs), Complex Programmable Logic Devices (CPLDs), Field-Programmable Gate Arrays (FPGAs), or other electronic components. The units and/or modules are configured to perform the method according to the embodiments of the present disclosure.

Figure 2:
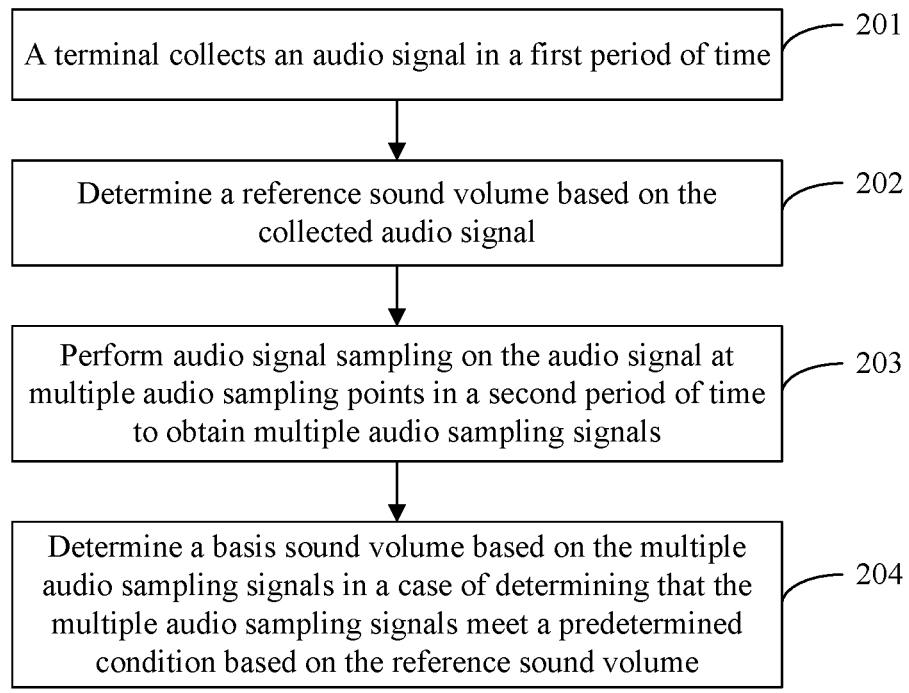
FIG. 2 is a flowchart of an audio signal processing method according to an embodiment of the present disclosure.

FIG. 2 is a flowchart of an audio signal processing method according to an embodiment of the present disclosure. Referring to FIG. 2, the audio signal processing method according to the embodiment of the present disclosure includes steps S201 to S204.

In step 201, a terminal collects an audio signal in a first period of time.

Figure 3:
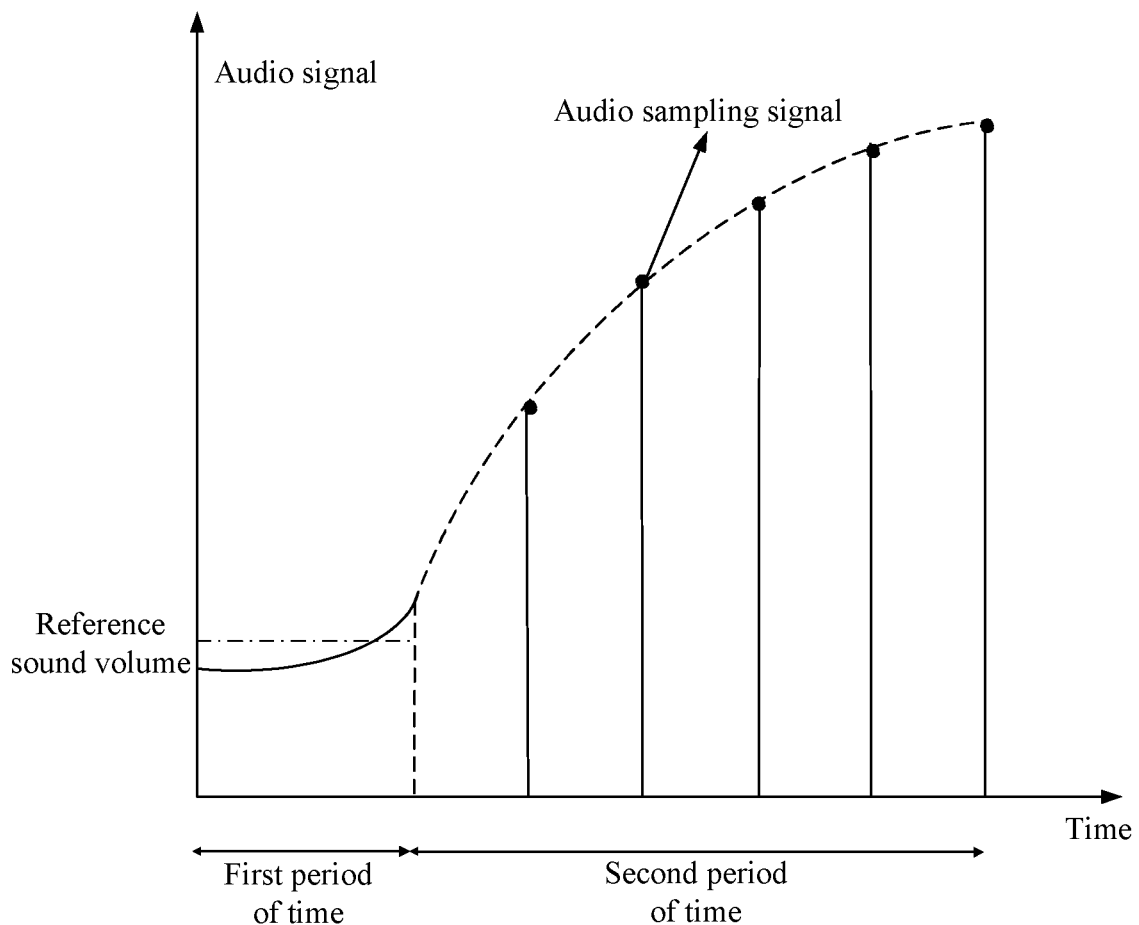
FIG. 3 is a schematic diagram of an audio signal according to an embodiment of the present disclosure.

In practical applications, the terminal is provided with an audio collection device such as a microphone. The audio collection apparatus collects an audio signal. Here the audio signal may be a sound made by user speaking or shouting. The sound is a continuous audio signal. Amplitude of the audio signal indicates strength of the sound, and a frequency of the audio signal indicates a pitch. Generally, the audio signal is an unsteady signal. However, the audio signal may be considered to be steady in a short period of time. Therefore, the audio signal may be collected continuously in a short period of time. In some embodiments, a length of the first period of time may be set according to actual needs. For example, the first period of time may be a time period from the time point 10 ms to the time point 30 ms of the audio collection. As shown in FIG. 3, a continuous audio signal is obtained in the first period of time.

In step 202, a reference sound volume is determined based on the collected audio signal.

In some embodiments, the collected audio signal is processed to obtain sound volumes corresponding to the audio signal in the first period of time. An average of the sound volumes corresponding to the audio signal in the first period of time is acquired, and the acquired average is determined as the reference sound volume.

In practical applications, a waveform of the collected audio signal is acquired, and amplitudes corresponding to the audio signal are determined. Energy calculation is performed on the amplitudes corresponding to the audio signal in the first period of time to obtain the sound volumes corresponding to the audio signal in the first period of time.

In some embodiments, the collected audio signal is processed to obtain a maximum sound volume and a minimum sound volume of the audio signal in the first period of time, and an average of the maximum sound volume and the minimum sound volume is determined as the reference sound volume.

In practical applications, a waveform of the collected audio signal is acquired, and a maximum amplitude and a minimum amplitude of the audio signal are determined. Energy calculation is performed on the maximum amplitude and the minimum amplitude to obtain a maximum sound volume and a minimum sound volume. An average of the maximum sound volume and the minimum sound volume is calculated, and the average is determined as the reference sound volume.

In step 203, audio signal sampling is performed on the audio signal at multiple audio sampling points in a second period of time to obtain multiple audio sampling signals.

In practical applications, a length of the second period of time may be set according to actual needs. For example, the second period of time may be a time period from the time point 30 ms to the time point 120 ms of the audio collection. Audio signal sampling is performed in the second period of time to obtain multiple discrete audio signals. As shown in FIG. 3, the second period of time is a time period following the first period of time, and the second period of time and the first period of time form a continuous period of time. A quantity of audio sampling signals obtained in the second period of time may be set according to actual needs. For example, five audio sampling signals are obtained in the second period of time.

In some embodiments, uniform sampling at equal intervals is performed on the audio signal in the second period of time, that is, an interval between any two adjacent samplings is constant. The sampling interval for performing audio sampling may be predetermined. The terminal acquires the sampling interval for the audio signal sampling, and determines multiple audio sampling points in the second period of time based on the sampling interval. For example, the sampling interval may be set to be 50 ms and thus five sampling points are determined based on the sampling interval. In this case, after the first period of time, one audio sampling signal is obtained every 50 ms. The second period of time is the time period of 250 ms after the first period of time.

In some embodiments, the audio signal sampling performed in the second period of time may be non-uniform sampling. For example, random sampling may be performed in the second period of time to obtain a predetermined number of audio sampling signals.

In step 204, a basis sound volume is determined based on the multiple audio sampling signals in a case of determining that the multiple audio sampling signals meet a predetermined condition based on the reference sound volume.

Here the basis sound volume is used for controlling a display effect of a target object in a virtual scene. Different basis sound volumes correspond to different display effects of the target object.

Figure 4A:
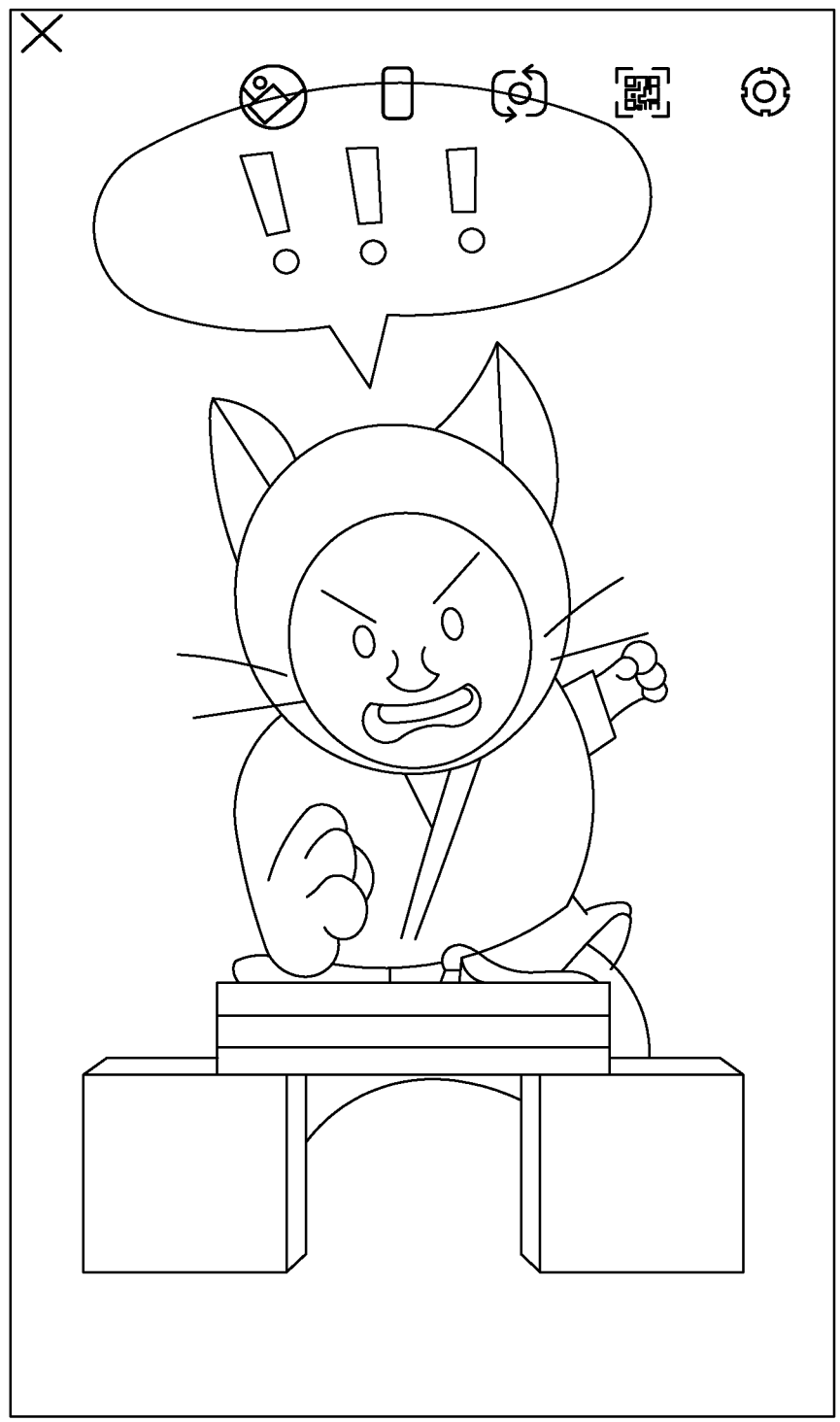
FIG. 4A is a schematic diagram showing an interface in which a game character is controlled based on a sound volume according to an embodiment of the present disclosure.
Figure 4B:
FIG. 4B is a schematic diagram showing an interface in which a game character is controlled based on a sound volume according to an embodiment of the present disclosure.

In practical applications, the virtual scene may be a virtual scene of a game, a special effect scene, and the like. The target object may be a game character, a person, an object and the like in the virtual scene. FIG. 4A and FIG. 4B are schematic diagrams each showing an interface in which a game character is controlled based on a sound volume according to an embodiment of the present disclosure. Referring to FIG. 4A and FIG. 4B, in a virtual scene of a brick-splitting game, a game character serves as a target object controlled by a sound volume. Strength of the game character to split a brick is controlled based on the determined basis sound volume corresponding to the audio signal. A large determined basis sound volume corresponds to a powerful strength of the game character to split the brick. In practical implementation, one or more sound volume levels may be set. For example, a first sound volume level and a second sound volume level are set and the second sound volume level is greater than the first sound volume level. Referring to FIG. 4A, in a case that the basis sound volume does not reach the first sound volume level, the brick cannot be split. Referring to FIG. 4B, in a case that the basis sound volume is between the first sound volume level and the second sound volume level, three bricks are split. In a case that the basis sound volume is greater than the second sound volume level, more than three bricks are split, for example, five bricks are split.

Figure 5A:
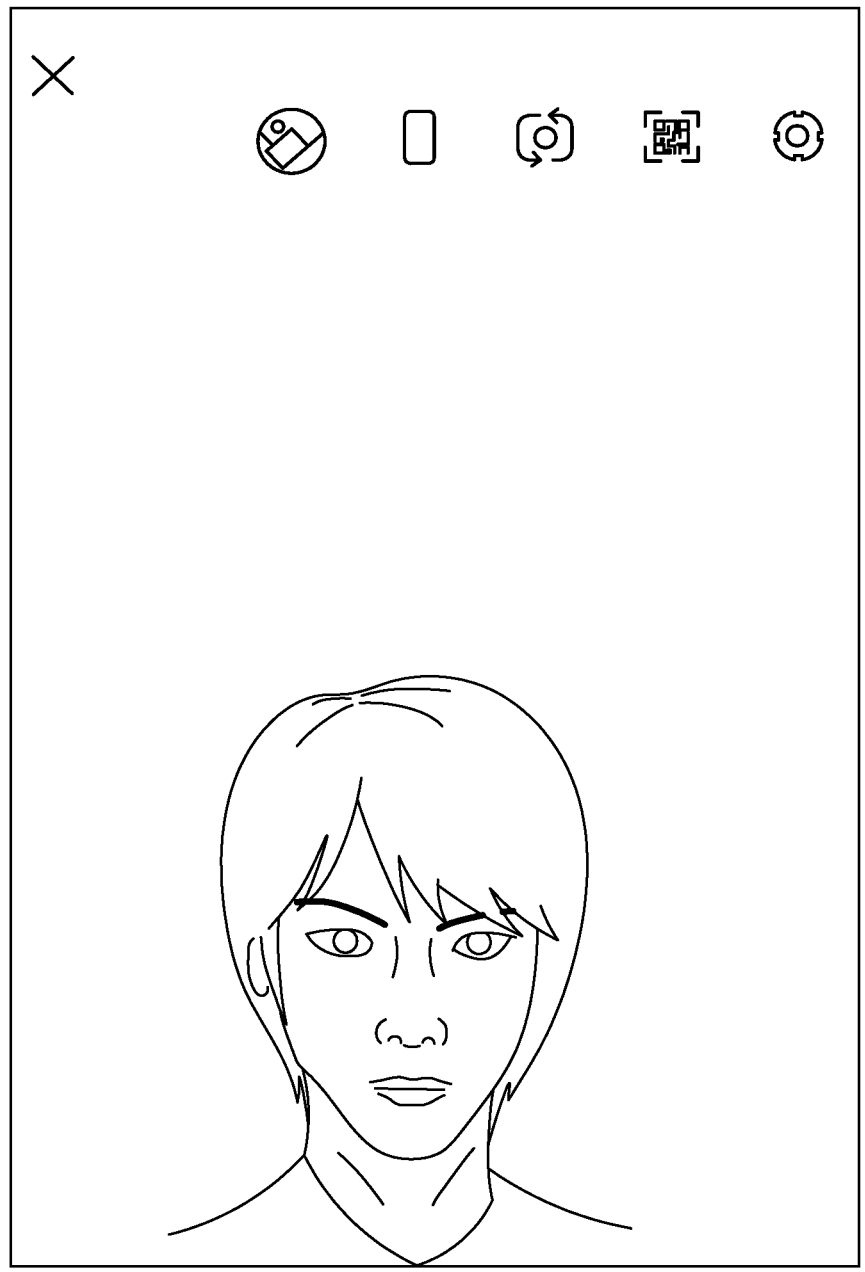
FIG. 5A is a schematic diagram showing an interface in which display of a character object is controlled based on a sound volume according to an embodiment of the present disclosure.
Figure 5B:
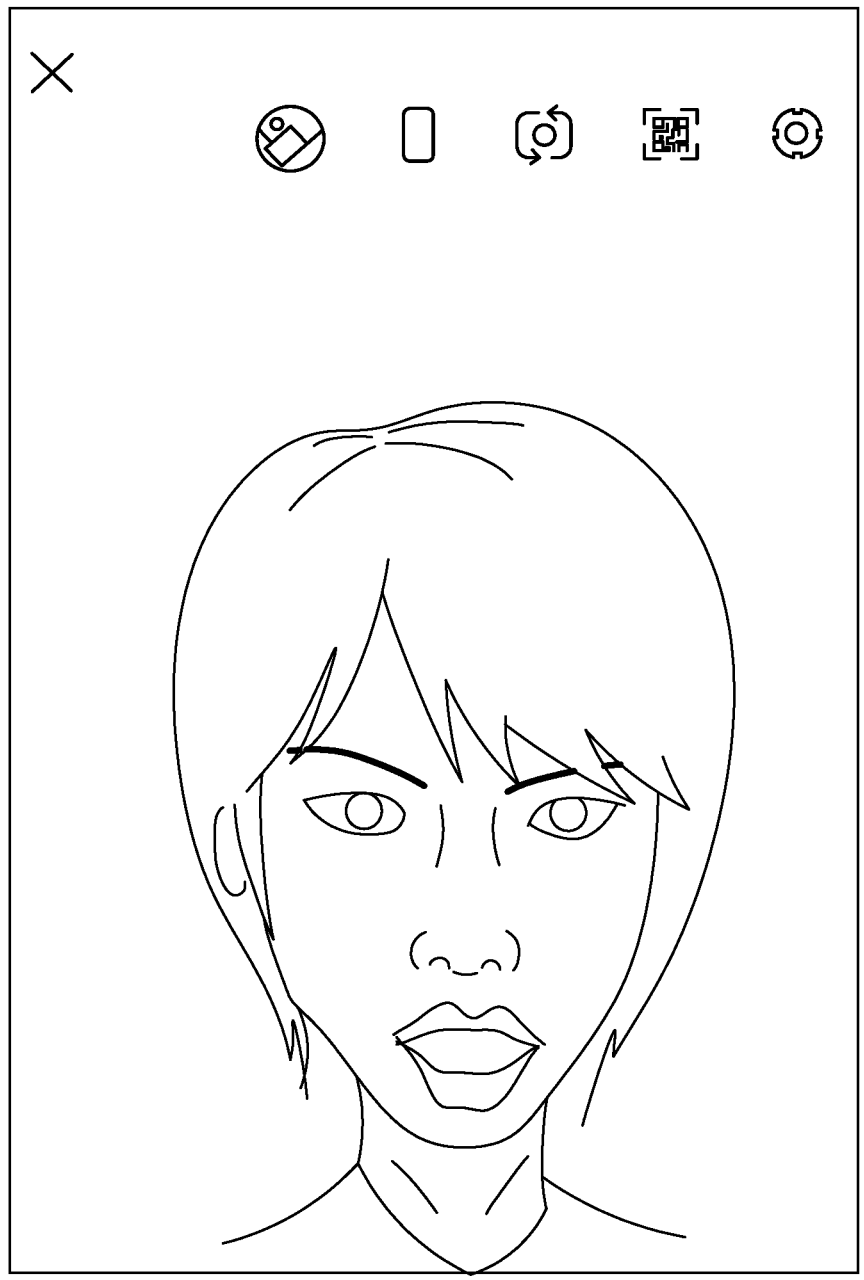
FIG. 5B is a schematic diagram showing an interface in which display of a character object is controlled based on a sound volume according to an embodiment of the present disclosure.

FIG. 5A and FIG. 5B are schematic diagrams each showing an interface in which display of a character object is controlled based on a sound volume according to an embodiment of the present disclosure. Referring to FIG. 5A and FIG. 5B, in a special effect scene in which display of a character object is controlled by a sound volume, the character object serves as a target object controlled by the sound volume. A display size of a head of the character is controlled by the determined basis sound volume corresponding to the audio signal. A large determined basis sound volume corresponds to a large display size of the head of the character. In practical implementation, one or more sound volume levels may be set. For example, a first sound volume level and a second sound volume level are set and the second sound volume level is greater than the first sound volume level. Referring to FIG. 5A, in a case that the basis sound volume is less than the first sound volume level, the head of the character is displayed according to an original scale. Referring to FIG. 5B, in a case that the basis sound volume is between the first sound volume level and the second sound volume level, the head of the character is magnified twice and displayed. In a case that the basis sound volume is greater than the second sound volume level, the head of the character is magnified more than twice. For example, the head of the character is magnified three times.

Figure 6A:
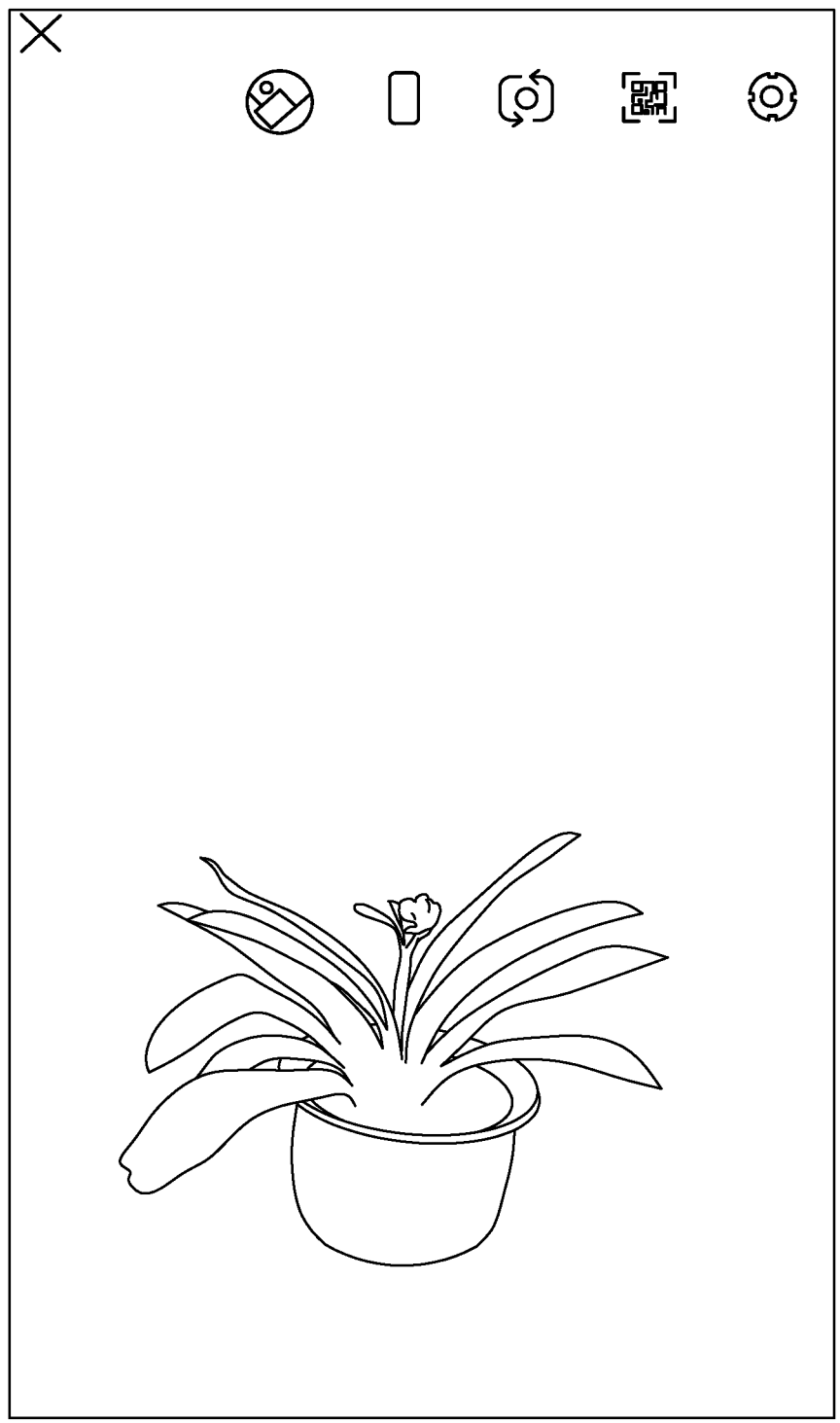
FIG. 6A is a schematic diagram showing an interface in which a blooming effect of a flower is controlled based on a sound volume according to an embodiment of the present disclosure.
Figure 6B:
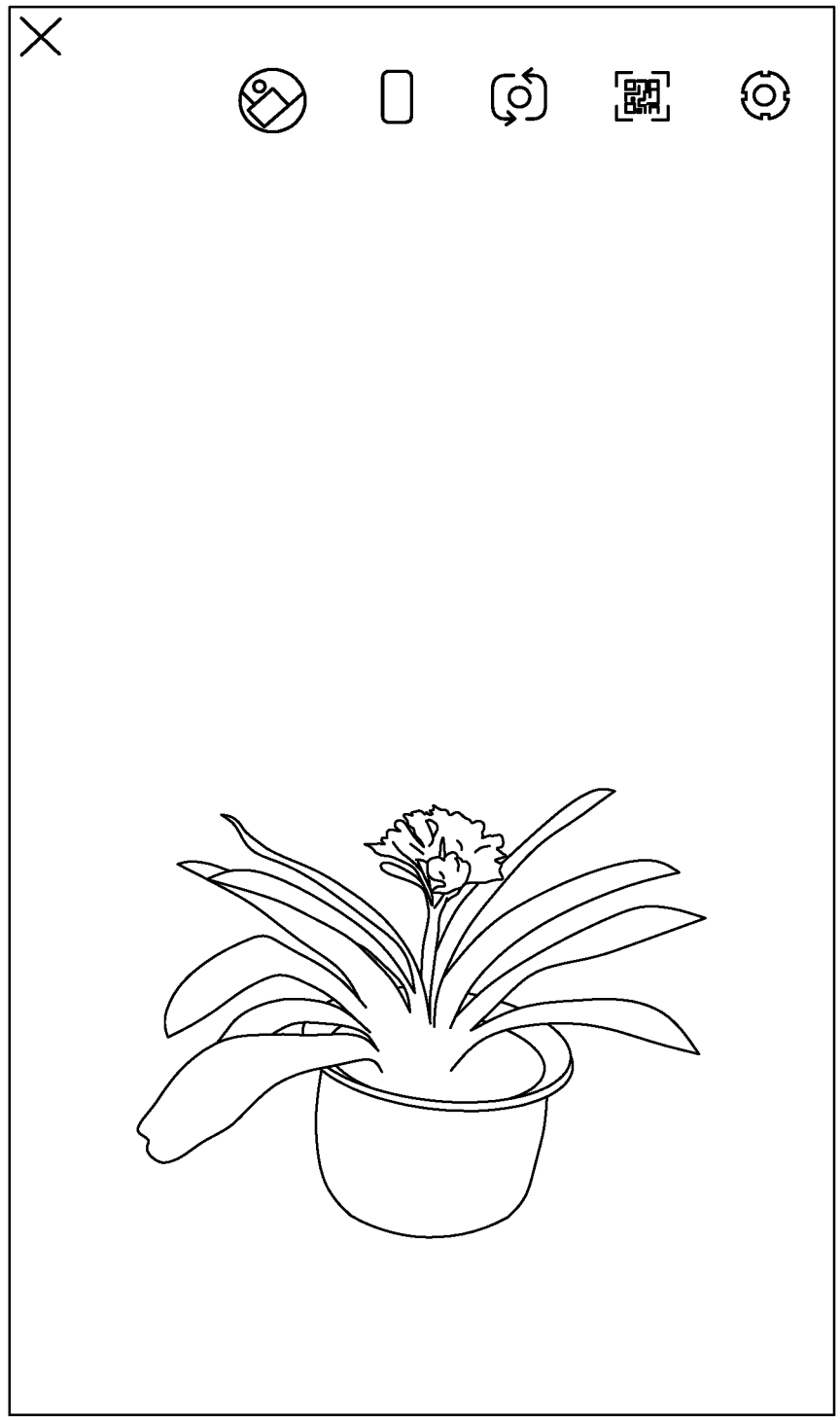
FIG. 6B is a schematic diagram showing an interface in which a blooming effect of a flower is controlled based on a sound volume according to an embodiment of the present disclosure.

FIG. 6A and FIG. 6B are schematic diagrams each showing an interface in which a blooming effect of a flower is controlled based on a sound volume according to an embodiment of the present disclosure. Referring to FIG. 6A and FIG. 6B, in a special effect in which a blooming effect of a flower is controlled based on a sound volume, the flower serve as a target object controlled by the sound volume. A blooming degree of the flower is controlled by the determined basis sound volume corresponding to the audio signal. A large determined basis sound volume corresponds to a high blooming degree of the flower. In practical implementation, one or more sound volume levels may be set. For example, a first sound volume level and a second sound volume level are set and the second sound volume level is greater than the first sound volume level. In a case that the basis sound volume is less than the first sound volume level, the flower does not bloom. Referring to FIG. 6A, in a case that the basis sound volume is between the first sound volume level and the second sound volume level, the blooming degree of the flower reaches fifty percent. Referring to FIG. 6B, in a case that the basis sound volume is greater than the second sound volume level, the flower blows completely, that is, the blooming degree of the flower reaches hundred percent.

In some embodiments, the terminal may determine the basis sound volume by: determining, in a case of determining that sound volumes of the multiple audio sampling signals are all greater than the reference sound volume and a maximum sound volume of the multiple audio sampling signals is greater than the predetermined sound volume threshold, the basis sound volume based on the multiple audio sampling signals.

In practical applications, the terminal determines whether the sound volumes of the multiple audio sampling signals collected in the second period of time are all greater than the reference sound volume. In a case of determining that the sound volumes of the multiple audio sampling signals are all greater than the reference sound volume, the terminal further determines whether the maximum sound volume of the multiple audio sampling signals is greater than the predetermined sound volume threshold. In a case of determining that the sound volumes of the multiple audio sampling signals are not all greater than the reference sound volume, audio signal sampling is performed in a period of time after the second period of time. In a case of determining that the maximum sound volume of the multiple audio sampling signals is greater than the predetermined sound volume threshold, the basis sound volume is determined based on the multiple audio sampling signals collected in the second period of time. In a case of determining that the maximum sound volume of the multiple audio sampling signals is not greater than the predetermined sound volume threshold, audio signal sampling is performed in a period of time after the second period of time.

It should be noted that, if the sound volumes of the multiple audio sampling signals are all greater than the reference sound volume, it is indicated that the audio signal in the second period of time includes a rising edge. For example, as shown in FIG. 3, the sound volumes of the five audio sampling points in the second period of time are all greater than the reference sound volume, and the audio signal in the second period of time includes a rising edge. Here, the predetermined sound volume threshold may be set based on the reference sound volume. For example, the predetermined sound volume threshold may be 10 times the reference sound volume. Alternatively, the predetermined sound volume threshold may be a fixed value, for example, 70 decibels.

In some embodiments, the terminal may determine the basis sound volume by: determining a valid audio sampling signal in the multiple audio sampling signals based on the reference sound volume; and calculating, in a case of determining that a quantity of the valid audio sampling signals is greater than a predetermined quantity threshold and a maximum sound volume of the multiple valid audio sampling signals is greater than a predetermined sound volume threshold, an average of sound volumes of the multiple valid audio sampling signals to obtain the basis sound volume.

It should be noted that due to a fluctuation in the audio signal or an error in the sampling, an invalid audio sampling signal may be caused. The invalid audio sampling signal should be filtered out from the multiple audio sampling signals. In a case that a quantity of valid audio sampling signals is greater than the predetermined quantity threshold and the maximum sound volume of the multiple valid audio sampling signals is greater than the predetermined sound volume threshold, it is considered that a condition for obtaining the basis sound volume is met.

In the embodiments of the present disclosure, the basis sound volume is obtained by calculating the average of the sound volumes of the multiple valid audio sampling signals, which avoids influence caused by a fluctuation of the audio signal or an error in sampling, thereby improving accuracy of the determined basis sound volume.

In some embodiments, the valid audio sampling signal may be determined by: processing the multiple audio sampling signals to obtain sound volumes of the multiple audio sampling signals; and determining an audio sampling signal having a sound volume greater than the reference sound volume as a valid audio sampling signal.

In practical applications, amplitude of each audio sampling signal is acquired and a sound volume of the audio sampling signal is determined based on the amplitude. An audio sampling signal having a sound volume greater than the reference sound volume is determined as a valid audio sampling signal. It is determined whether, in the audio sampling signals, a quantity of audio sampling signals with a sound volume greater than the reference sound volume is greater than the predetermined quantity threshold and whether, in the audio sampling signals, the maximum sound volume is greater than the predetermined sound volume threshold. If a quantity of audio sampling signals with a sound volume greater than the reference sound volume is greater than the predetermined quantity threshold and the maximum sound volume is greater than the predetermined sound volume threshold, an average of sound volumes of the audio sampling signals with a sound volume greater than the reference sound volume is calculated, and the average is determined as the basis sound volume.

In some embodiments, the basis sound volume may be obtained based on the multiple audio sampling signals by: processing the obtained multiple audio sampling signals to acquire sound volumes of the multiple audio sampling signals; calculating an average of sound volumes of the multiple audio sampling signals and determining the average of the sound volumes of the multiple audio sampling signals as the basis sound volume. For example, as shown in FIG. 3, amplitudes of the five audio sampling signals are acquired to obtain sound volumes of the five audio sampling signals. An average of the five sound volumes is calculated, and the average is determined as the basis sound volume.

In some embodiments, the basis sound volume may also be obtained based on the multiple audio sampling signals by: processing the obtained multiple audio sampling signals to obtain a maximum sound volume and a minimum sound volume of the multiple audio sampling signals, calculating an average of the maximum sound volume and the minimum sound volume, and determining the average of the maximum sound volume and the minimum sound volume as the basis sound volume. For example, as shown in FIG. 3, a maximum sound volume and a minimum sound volume of the five audio sampling signals are acquired, that is, a sound volume of the third audio sampling signal and a sound volume of the first audio sampling signal are acquired. An average of sound volumes of the third audio sampling signal and the first audio sampling signal is calculated and the average is determined as the basis sound volume.

In the above embodiments of the present disclosure, the reference sound volume is determined based on the audio signal collected in the first period of time, and in a case of determining that the multiple audio sampling signals in the second period of time meet the predetermined condition based on the reference sound volume, the basis sound volume is determined based on the multiple audio sampling signals. Since the basis sound volume is determined based on the multiple audio sampling signals in the second period of time, which are irrelevant to a distance between the user and the terminal or the sound volume setting of a microphone of the terminal, the basis sound volume can be determined based on the multiple audio sampling signals in the second period of time as long as the multiple audio sampling signals in the second period of time meet the predetermined condition. In this way, inaccurate audio collection caused by a change in the distance between the user and the terminal or by different sound volume settings of the microphone of the terminal is avoided, thereby improving accuracy of the basis sound volume used for controlling a display effect of a target object in a virtual scene.

Figure 7:
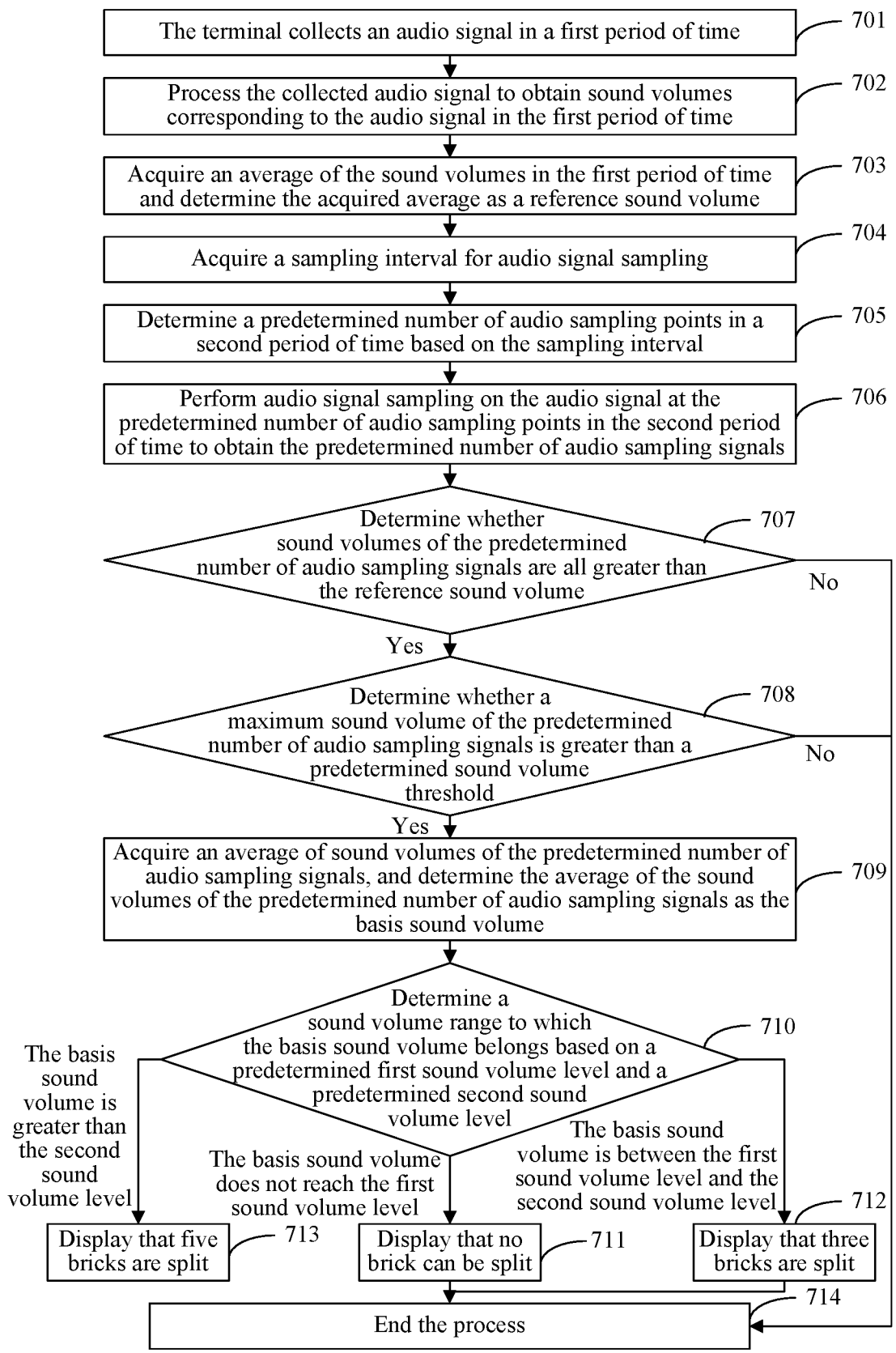
FIG. 7 is a flowchart of an audio signal processing method according to an embodiment of the present disclosure.

The audio signal processing method according to the embodiments of the present disclosure is described hereafter with an example that strength of a game character in a virtual scene of a game to split a brick is controlled by a sound volume. FIG. 7 is a flowchart of the audio signal processing method according to an embodiment of the present disclosure. The audio signal processing method may be performed by a terminal. Referring to FIG. 7, the audio signal processing method according to the embodiments of the present disclosure includes the following steps 701 to 714.

In step 701, the terminal collects an audio signal in a first period of time.

In practical implementation, a length of the first period of time may be set according to actual needs. For example, the first period of time may be the time period from the time point 10 ms to the time point 30 ms of the audio collection.

In step 702, the collected audio signal is processed to obtain sound volumes corresponding to the audio signal in the first period of time.

In step 703, an average of the sound volumes in the first period of time is acquired and the acquired average is determined as a reference sound volume.

In step 704, a sampling interval for audio signal sampling is acquired.

In step 705, a predetermined number of audio sampling points in a second period of time are determined based on the sampling interval.

In practical applications, the second period of time is a time period following the first period of time, and the second period of time and the first period of time form a continuous period of time. For example, the second period of time may be the time period from the time point 30 ms to the time point 120 ms of the audio collection.

In step 706, audio signal sampling is performed on the audio signal at the predetermined number of audio sampling points in the second period of time to obtain the predetermined number of audio sampling signals.

In practical implementation, uniform sampling at equal interval is performed on the audio signal in the second period of time, that is, an interval between any two adjacent samplings is constant. The sampling interval for audio sampling may be predetermined.

In step 707, it is determined whether sound volumes of the predetermined number of audio sampling signals are all greater than the reference sound volume. If the sound volumes of the predetermined number of audio sampling signals are all greater than the reference sound volume, step 708 is performed. If the sound volumes of the predetermined number of audio sampling signals are not all greater than the reference sound volume, step 713 is performed.

In some embodiments, in a case of determining that there is an audio signal having a sound volume not greater than the reference sound volume in the collected predetermined number of audio sampling signals, audio signal sampling may be performed again in a following third period of time, which is repeated until the audio sampling signals obtained through the audio signal sampling include the predetermined number of audio sampling signals having sound volumes greater than the reference sound volume, and then step 708 is performed. The third period of time is a time period following the second period of time, and the third period of time and the second period of time form a continuous period of time. For example, the third period of time may be the time period from the time point 120 ms to the time point 210 ms of the audio collection.

In step 708, it is determined whether a maximum sound volume of the predetermined number of audio sampling signals is greater than a predetermined sound volume threshold. In a case that the maximum sound volume is greater than the predetermined sound volume threshold, step 709 is performed. In a case that the maximum sound volume is not greater than the predetermined sound volume threshold, step 713 is performed.

In some embodiments, in a case of determining that the maximum sound volume of the predetermined number of audio sampling signals is not greater than the predetermined sound volume threshold, audio signal sampling may be performed again in a next period of time, until the audio sampling signals obtained through the audio signal sampling include the predetermined number of audio sampling signals having sound volumes greater than the reference sound volume and include an audio sampling signal having a sound volume greater than the predetermined sound volume threshold, and then step 709 is performed.

In step 709, an average of sound volumes of the predetermined number of audio sampling signals is acquired, and the average of the sound volumes of the predetermined number of audio sampling signals is determined as the basis sound volume.

In step 710, a sound volume range to which the basis sound volume belongs is determined based on the predetermined first sound volume level and the predetermined second sound volume level. In a case that the basis sound volume does not reach the first sound volume level, step 711 is performed. In a case that the basis sound volume is between the first sound volume level and the second sound volume level, step 712 is performed. In a case that the basis sound volume is greater than the second sound volume level, step 713 is performed.

Here the second sound volume level is greater than the first sound volume level.

In step 711, an effect that no brick can be split is displayed.

In step 712, an effect that three bricks are split is displayed.

In step 713, an effect that five bricks are split is displayed.

In step 714, the process is ended.

Figure 8:
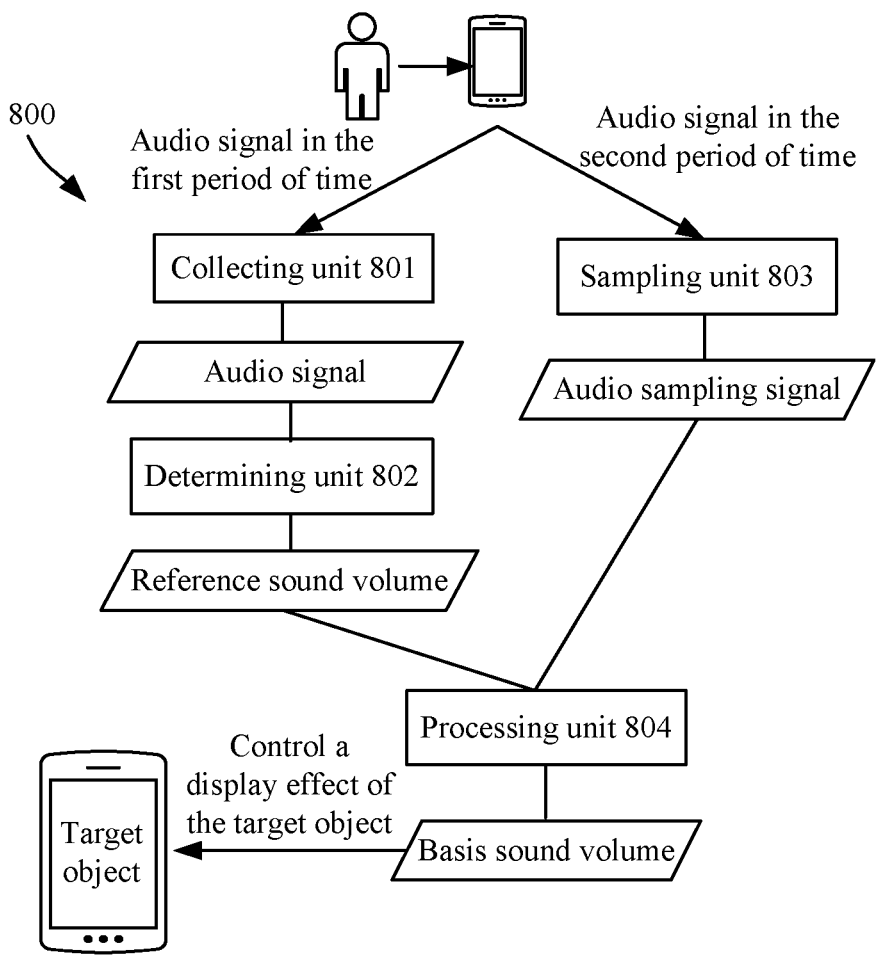
FIG. 8 is a schematic structural diagram of an audio signal processing apparatus according to an embodiment of the present disclosure.

Software implementation of the audio signal processing apparatus according to the embodiments of the present disclosure is described below. FIG. 8 is a schematic structural diagram of an audio signal processing apparatus according to an embodiment of the present disclosure. Referring to FIG. 8, an audio signal processing apparatus 800 according to the embodiments of the present disclosure includes a collecting unit 801, a determining unit 802, a sampling unit 803 and a processing unit 804.

The collecting unit 801 is configured to collect an audio signal in a first period of time.

The determining unit 802 is configured to determine a reference sound volume based on the collected audio signal.

The sampling unit 803 is configured to perform audio signal sampling on the audio signal at multiple audio sampling points in a second period of time to obtain multiple audio sampling signals.

The processing unit 804 is configured to determine, in a case of determining that the multiple audio sampling signals meet a predetermined condition based on the reference sound volume, a basis sound volume based on the multiple audio sampling signals.

The basis sound volume is used for controlling a display effect of a target object in a virtual scene. Different basis sound volumes correspond to different display effects of the target object.

In some embodiments, the determining unit 802 is further configured to process the collected audio signal to obtain sound volumes corresponding to the audio signal in the first period of time; acquire an average of the sound volumes in the first period of time, and determine the acquired average as the reference sound volume.

In some embodiments, the determining unit 802 is further configured to process the collected audio signal to obtain a maximum sound volume and a minimum sound volume of the audio signal in the first period of time; and determine an average of the maximum sound volume and the minimum sound volume as the reference sound volume.

In some embodiments, the audio signal processing apparatus further includes an acquiring unit. The acquiring unit is configured to acquire a sampling interval for audio signal sampling, and determine multiple audio sampling points in the second period of time based on the sampling interval.

In some embodiments, the processing unit 804 is further configured to determine, in a case of determining that sound volumes of the multiple audio sampling signals are all greater than the reference sound volume and a maximum sound volume of the multiple audio sampling signals is greater than a predetermined sound volume threshold, a basis sound volume based on the multiple audio sampling signals.

In some embodiments, the processing unit 804 is further configured to determine a valid audio sampling signal in the multiple audio sampling signals based on the reference sound volume; and calculate, in a case of determining that a quantity of valid audio sampling signals is greater than a predetermined quantity threshold and a maximum sound volume of multiple valid audio sampling signals is greater than a predetermined sound volume threshold, an average of sound volumes of the multiple valid audio sampling signals to obtain the basis sound volume.

In some embodiments, the processing unit 804 is further configured to process the multiple audio sampling signals to obtain sound volumes of the multiple audio sampling signals; and determine an audio sampling signal having a sound volume greater than the reference sound volume as a valid audio sampling signal.

In some embodiments, the processing unit 804 is further configured to process the obtained multiple audio sampling signals to acquire sound volumes of the multiple audio sampling signals; and acquire an average of the sound volumes of the multiple audio sampling signals and determine the average of the sound volumes of the multiple audio sampling signals as the basis sound volume.

Here it should be noted that the above description of the audio signal processing apparatus is similar to the description of the audio signal processing method. The beneficial effects of the apparatus are the same as those of the method and are not repeated herein. For technical details not disclosed in the embodiments of the audio signal processing apparatus according to the present disclosure, one may refer to the description in the embodiments of the audio signal processing method according to the present disclosure.

A terminal is further provided according to the embodiments of the present disclosure. The terminal includes a memory and a processor. The memory is configured to store executable instructions. The processor is configured to execute the executable instructions stored in the memory to perform the audio signal processing method according to the embodiments of the present disclosure.

A readable storage medium is further provided according to the embodiments of the present disclosure. The storage medium may include various media capable of storing program codes, such as a mobile storage device, a random access memory (RAM), a read-only memory (ROM), a magnetic disc or an optical disc. The readable storage medium stores executable instructions. The executable instructions are used for performing, when being executed by the processor, the audio signal processing method according to the embodiments of the present disclosure.

The above descriptions are only embodiments of the present disclosure, and not intend to limit the protection scope of the present disclosure. Variations or substitutions made by those skilled in the art within the technical scope of the present disclosure fall within the protection scope of the present disclosure. Therefore, the protection scope of the present disclosure should coincide with the protection scope limited by the claims.

The invention claimed is:

1. An audio signal processing method, comprising:
collecting an audio signal in a first period of time;
determining a reference sound volume based on the collected audio signal;
generating a plurality of audio sampling signals by performing audio signal sampling on an audio signal collected in a second period of time at a plurality of audio sampling points;
determining whether the plurality of audio sampling signals meet a predetermined condition, wherein the predetermined condition is associated with the reference sound volume;
determining a basis sound volume based on the plurality of audio sampling signals in response to determining that the plurality of audio sampling signals meet the predetermined condition; and
controlling a display effect of a target object in a virtual scene based on the basis sound volume, wherein different basis sound volumes correspond to different display effects of the target object.

2. The method according to claim 1, wherein the determining a reference sound volume based on the collected audio signal comprises:
processing the collected audio signal to obtain sound volumes corresponding to the audio signal in the first period of time; and
acquiring an average of the sound volumes corresponding to the audio signal in the first period of time and determining the acquired average as the reference sound volume.

3. The method according to claim 1, wherein the determining a reference sound volume based on the collected audio signal comprises:
processing the collected audio signal to obtain a maximum sound volume and a minimum sound volume of the audio signal in the first period of time; and
determining an average of the maximum sound volume and the minimum sound volume as the reference sound volume.

4. The method according to claim 1, further comprising:
acquiring a sampling interval for the audio signal sampling; and
determining the plurality of audio sampling points in the second period of time based on the sampling interval.

5. The method according to claim 1, wherein the determining, in a case of determining that the plurality of audio sampling signals meet a predetermined condition based on the reference sound volume, a basis sound volume based on the plurality of audio sampling signals comprises:
determining, in a case of determining that sound volumes of the plurality of audio sampling signals are all greater than the reference sound volume and a maximum sound volume of the plurality of audio sampling signals is greater than a predetermined sound volume threshold, the basis sound volume based on the plurality of audio sampling signals.

6. The method according to claim 1, wherein the determining, in a case of determining that the plurality of audio sampling signals meet a predetermined condition based on the reference sound volume, a basis sound volume based on the plurality of audio sampling signals comprises:
determining a valid audio sampling signal in the plurality of audio sampling signals based on the reference sound volume; and
calculating, in a case of determining that a quantity of valid audio sampling signals is greater than a predetermined quantity threshold and a maximum sound volume of a plurality of valid audio sampling signals is greater than a predetermined sound volume threshold, an average of sound volumes of the plurality of valid audio sampling signals to obtain the basis sound volume.

7. The method according to claim 6, wherein the determining a valid audio sampling signal in the plurality of audio sampling signals based on the reference sound volume comprises:
processing the plurality of audio sampling signals to obtain sound volumes of the plurality of audio sampling signals; and
determining an audio sampling signal having a sound volume greater than the reference sound volume as the valid audio sampling signal.

8. The method according to claim 1, wherein the determining a basis sound volume based on the plurality of audio sampling signals comprises:
processing the plurality of audio sampling signals to acquire sound volumes of the plurality of audio sampling signals; and
acquiring an average of the sound volumes of the plurality of audio sampling signals and determining the average of the sound volumes of the plurality of audio sampling signals as the basis sound volume.

9. An audio signal processing apparatus, comprising:
a memory configured to store executable instructions; and
a processor configured to execute the executable instructions stored in the memory to perform operations of:
collecting an audio signal in a first period of time;
determining a reference sound volume based on the collected audio signal;
generating a plurality of audio sampling signals by performing audio signal sampling on an audio signal collected in a second period of time at a plurality of audio sampling points;
determining whether the plurality of audio sampling signals meet a predetermined condition, wherein the predetermined condition is associated with the reference sound volume;
determining a basis sound volume based on the plurality of audio sampling signals in response to determining that the plurality of audio sampling signals meet the predetermined condition; and
controlling a display effect of a target object in a virtual scene based on the basis sound volume, wherein different basis sound volumes correspond to different display effects of the target object.

10. The apparatus according to claim 9, wherein the processor configured to execute the executable instructions stored in the memory to perform the operations of:
processing the collected audio signal to obtain sound volumes corresponding to the audio signal in the first period of time; and
acquiring an average of the sound volumes corresponding to the audio signal in the first period of time, and determine the acquired average as the reference sound volume.

11. The apparatus according to claim 9, wherein the processor configured to execute the executable instructions stored in the memory to perform the operations of:
processing the collected audio signal to obtain a maximum sound volume and a minimum sound volume of the audio signal in the first period of time; and
determining an average of the maximum sound volume and the minimum sound volume as the reference sound volume.

12. The apparatus according to claim 9, the processor configured to execute the executable instructions stored in the memory to perform the operations of:
acquiring a sampling interval for the audio signal sampling, and determine the plurality of audio sampling points in the second period of time based on the sampling interval.

13. The apparatus according to claim 9, wherein the processor configured to execute the executable instructions stored in the memory to perform the operations of:
determining, in a case of determining that sound volumes of the plurality of audio sampling signals are all greater than the reference sound volume and a maximum sound volume of the plurality of audio sampling signals is greater than a predetermined sound volume threshold, the basis sound volume based on the plurality of audio sampling signals.

14. The apparatus according to claim 9, wherein the processor configured to execute the executable instructions stored in the memory to perform the operations of:
determining a valid audio sampling signal in the plurality of audio sampling signals based on the reference sound volume; and
calculating, in a case of determining that a quantity of valid audio sampling signals is greater than a predetermined quantity threshold and a maximum sound volume of a plurality of valid audio sampling signals is greater than a predetermined sound volume threshold, an average of sound volumes of the plurality of valid audio sampling signals to obtain the basis sound volume.

15. The apparatus according to claim 14, wherein the processor configured to execute the executable instructions stored in the memory to perform the operations of:
processing the plurality of audio sampling signals to obtain sound volumes of the plurality of audio sampling signals; and
determining an audio sampling signal having a sound volume greater than the reference sound volume as the valid audio sampling signal.

16. The apparatus according to claim 9, wherein the processor configured to execute the executable instructions stored in the memory to perform the operations of:
processing the plurality of audio sampling signals to acquire sound volumes of the plurality of audio sampling signals; and
acquiring an average of the sound volumes of the plurality of audio sampling signals and determine the average of the sound volumes of the plurality of audio sampling signals as the basis sound volume.

17. A non-transient storage medium storing executable instructions, wherein the instructions, when being executed by a processor, cause the processor to implement operations comprising:
collecting an audio signal in a first period of time;
determining a reference sound volume based on the collected audio signal;
generating a plurality of audio sampling signals by performing audio signal sampling on an audio signal collected in a second period of time at a plurality of audio sampling points;

determining whether the plurality of audio sampling signals meet a predetermined condition, wherein the predetermined condition is associated with the reference sound volume;

determining a basis sound volume based on the plurality of audio sampling signals in response to determining that the plurality of audio sampling signals meet the predetermined condition; and controlling a display effect of a target object in a virtual scene based on the basis sound volume, wherein different basis sound volumes correspond to different display effects of the target object.

\* \* \* \* \*